US010889040B2

(12) United States Patent
Troendle et al.

(10) Patent No.: US 10,889,040 B2
(45) Date of Patent: Jan. 12, 2021

(54) METHOD OF PRODUCING A GLUELESS DUSTLESS COMPOSITE FLOORING MATERIAL SYSTEM

(71) Applicants: John B. Troendle, Harahan, LA (US); Mo Qifeng, Changzhou (CN)

(72) Inventors: John B. Troendle, Harahan, LA (US); Mo Qifeng, Changzhou (CN)

(73) Assignee: John B. Troendle, Harahan, LA (US)

( * ) Notice: Subject to any disclaimer, the term of this patent is extended or adjusted under 35 U.S.C. 154(b) by 0 days.

(21) Appl. No.: 16/432,106

(22) Filed: Jun. 5, 2019

(65) Prior Publication Data

US 2019/0283302 A1 Sep. 19, 2019

Related U.S. Application Data

(63) Continuation-in-part of application No. 15/194,891, filed on Jun. 28, 2016, now Pat. No. 10,343,381.

(51) Int. Cl.
*B29C 48/00* (2019.01)
*E04F 15/10* (2006.01)
(Continued)

(52) U.S. Cl.
CPC ............ *B29C 48/022* (2019.02); *B32B 27/08* (2013.01); *B32B 27/304* (2013.01); *B32B 37/06* (2013.01);
(Continued)

(58) Field of Classification Search
CPC . B32B 2255/10; B32B 27/304; B32B 37/182; B32B 2255/26; B32B 27/08; B32B 2419/04; B32B 2307/402; B32B 2255/20; B32B 37/06; B32B 2307/412; B32B 2307/554; E04F 15/107; E04F 15/105; B29C 48/022; B29L 2031/10; B29K 2027/06; B44C 5/0453
See application file for complete search history.

(56) References Cited

U.S. PATENT DOCUMENTS 3,032,822 A  5/1962  Maddock
4,680,368 A  7/1987  Nakamoto et al.
(Continued)

FOREIGN PATENT DOCUMENTS

| CN | 201972361 | 9/2011 |
| CN | 103881273 | 6/2014 |
| CN | 204920130 | 12/2015 |
| WO | WO2005116362 A1 | 12/2005 |
| WO | WO2007043082 | 4/2007 |

(Continued)

*Primary Examiner* — Vishal I Patel
(74) *Attorney, Agent, or Firm* — Keaty Law Firm LLC (57) ABSTRACT

A method of producing a glueless dustless composite flooring material system providing PVC-based flooring having waterproof layers providing different qualities of hardness, wear-resistance, sound deadening, and decorative patterns, avoiding the use of moisture-susceptible compressed cellulose-based filler, with layers fused together, avoiding the manufacturing complexity and delamination risks of using glue or adhesive, with a quickly-cured, UV-cured top coating providing long-lasting high performance and shortening and simplifying the manufacturing, which can be done in a sheet-form, essentially continuous-run manner, with an ability to quickly and simply change the optional design printing and texturing produced, and having an optional underlayment layer.

20 Claims, 6 Drawing Sheets

(51) Int. Cl.
  *B44C 5/04* (2006.01)
  *B32B 27/08* (2006.01)
  *B32B 27/30* (2006.01)
  *B32B 37/06* (2006.01)
  *B32B 37/18* (2006.01)
  *B29K 27/06* (2006.01)
  *B29L 31/10* (2006.01)

(52) U.S. Cl.
  CPC .......... *B32B 37/182* (2013.01); *B44C 5/0453* (2013.01); *E04F 15/105* (2013.01); *E04F 15/107* (2013.01); *B29K 2027/06* (2013.01); *B29L 2031/10* (2013.01); *B32B 2255/10* (2013.01); *B32B 2255/20* (2013.01); *B32B 2255/26* (2013.01); *B32B 2307/402* (2013.01); *B32B 2307/412* (2013.01); *B32B 2307/554* (2013.01); *B32B 2419/04* (2013.01)

(56) References Cited

U.S. PATENT DOCUMENTS

| | | |
|---|---|---|
| 6,558,795 B2 | 5/2003 | Olson et al. |
| 6,730,388 B2 | 5/2004 | MacQueen et al. |
| 8,166,718 B2 | 5/2012 | Liu |
| 2006/0142455 A1 | 6/2006 | Agarwal et al. |
| 2006/0175728 A1 | 8/2006 | Lavach et al. |
| 2009/0223162 A1 | 9/2009 | Chen et al. |
| 2011/0030300 A1 | 2/2011 | Liu |
| 2015/0210055 A1* | 7/2015 | Pervan ............ B41M 5/0011 156/277 |
| 2015/0267025 A1* | 9/2015 | Fang ............... B32B 3/06 428/318.6 |

FOREIGN PATENT DOCUMENTS

| | | |
|---|---|---|
| WO | WO2015060778 | 4/2015 |
| WO | WO2015158595 | 10/2015 |

* cited by examiner

METHOD OF PRODUCING A GLUELESS DUSTLESS COMPOSITE FLOORING MATERIAL SYSTEM

CROSS-REFERENCE TO RELATED APPLICATIONS

This application is a continuation-in-part of co-pending application Ser. No. 15/194,891 filed on Jun. 28, 2016, the full disclosure of which is incorporated by reference herein and priority of which is hereby claimed.

BACKGROUND OF THE INVENTION

This invention provides a method of producing a PVC-based glueless dustless composite flooring material system that is efficiently manufactured and yields long-lasting, high-performing flooring.

Existing flooring-material products that use compressed sawdust or dust, as a core material are susceptible to damage and premature failure from water or other liquids, especially in damp environments and in uses that require frequent cleaning. The compressed-dust core, however, provides flooring material with certain desirable characteristics, such as sound-deadening. Elimination of compressed dust in the flooring composition requires a novel way to regain those characteristics through the use of different materials or different manufacturing processes.

Existing laminated flooring-material products that use glue or adhesive to bind the layers are susceptible to delamination and premature failure, especially in a damp environment. The handling, the application of, and the setting up or curing of adhesives adds complexity to the process of manufacturing flooring, making this step a potential bottleneck, which prevents efficient continuous-run or long run manufacturing.

Applying a finishing coating to flooring material is a good way to improve the look and wear-resistance of flooring materials. But where the flooring material contains PVC, there are problems and issues in achieving proper adhesion of a finishing coating in the manufacturing process, and additional potential problems of premature delamination after installation. In order to get good adhesion in manufacturing, coatings requiring long curing times or complex handling are presently used. Polyurethane undergoes oxidative curing that is likely to take eight to ten hours. A two-part epoxy is likely to take at least thirty minutes to cure, which is still a long time and another potential bottleneck preventing continuous-run manufacturing. Also, two-part epoxy requires additional mixing and handling in the manufacturing process.

Surface designs and textures are usually printed on and pressed into flooring material, frequently imitating wood, stone, or tile. The present methods of applying these decorative patterns and textures are mostly limited to short, frequently repeating patterns that are impressed by a roller or plate of finite size. Where more than one color, tint, tone, or shade is to be applied, problems with registration frequently arise. Such limitations work against any ability to switch production from one decorative pattern to another. Once the production of a particular decorative pattern is calibrated and registered, there is some reluctance to make changes.

Where the manufacturer of flooring material has to address these problems, it is likely that either the price will go up or the profits will go down. If the problems are not addressed, the flooring material will likely fail prematurely.

A flooring material that is free of any water-based products, such as inks, or dyes, free of adhesives and free of compressed cellulose material, such as sawdust or dust, but still having the desired qualities, is thus needed. A manufacturing method that is more efficient, more economical, more varied in decorative patterns, faster, and produces more durable and high-performing flooring material is also presently needed.

U.S. Publication No. 2011/0030300 for a "Floor and Tile with Padding," published on Feb. 10, 2011 by David C. Liu, discloses a flexible floor board with a pad attached to the bottom side of the floor board. The pad covers partially the bottom side of the floor board and extends beyond the floor board. The bottom side of the pad is covered with a restickable glue layer and the floor board has a male lock on one end and a female lock on the other end. A floor board is engaged with an adjacent floor board by pressing down the female lock of the first floor board onto the male lock of the second floor board. The bottom side of the first floor board that is not covered by the pad is placed into contact with the pad of the second floor board that extends beyond the second floor board. The Liu flooring was developed due to the need for a hardwood floor without the problems of both glue-down and floating installation. The hardwood floor was meant to be installed easily without messy glue, without delamination, without hollow area, and without quick water damage.

U.S. Publication No. 2009/0223162 for a "Connecting System for Surface Coverings," published on Sep. 10, 2009 by Hao A. Chen et al., discloses a plank that has opposing first and second ends extending along a width of the plank, opposing first and second longitudinal sides extending along a length of the plank, and opposing top and bottom surfaces. The plank can have a tongue edge at the first end and a groove edge at the second end. The tongue edge can be detachably lockable into the groove edge of an adjacent, identical plank. Surface covering systems having a plurality of the planks connected together are also provided. In particular, a preferred embodiment of the floor plank comprises (1) a top surface; (2) a bottom surface; (3) a first longitudinal side; (4) a second longitudinal side opposing the first longitudinal side; (5) a first end extending along the width of the floor plank and comprising a tongue edge; and (6) a second end opposing the first end, extending along the width of the floor plank, and comprising a groove edge. The tongue edge includes a vertical distal surface, substantially vertical to the top and bottom surfaces; a top planar slanted surface extending away from the vertical distal surface toward the top surface; a vertical lip extending downwardly from the top surface; a channel disposed substantially between the top planar slanted surface and the top surface, the channel comprising a channel bottom and a channel back, the channel back extending away from the channel bottom toward the vertical lip; a pinnacle rail connecting the top planar slanted surface and the channel, wherein the channel bottom extends vertically below the pinnacle rail, and the channel back extends laterally further away from the vertical distal surface than does the vertical lip; a bottom planar slanted surface extending away from the vertical distal surface towards the bottom surface; and a vertical shoulder extending from the bottom planar slanted surface to the bottom surface.

U.S. Pat. No. 6,558,795 for a "Strippable Coating System," issued on May 6, 2003 to Keith E. Olson et al., provides for a radiation curable coating that contains an agent that imparts greater strippability to the cured coating. The agent can be included in the coating or in one or more subsequently-applied maintenance coats. The curable coating may be waterborne, comprised of inorganic particles, and the agents that impart greater strippability may enhance adhesion of a radiation curable maintenance coat to the cured coating. The agent may further comprise a chain transfer agent that reduces the molecular weight of the cured coating, and in a preferred embodiment may contain an alcohol, ester, aldehyde, or mixture thereof.

U.S. Pat. No. 6,730,388 for a "Coating Having Macroscopic Texture and Process for Making Same," issued on May 4, 2004 to Richard C. MacQueen et al., provides for, in one embodiment, a coated substrate that comprises a substrate, a radiation-cured coating or a thermally-cured coating on at least a portion of the substrate, wherein the coating comprises an inherent macroscopic texture. In another embodiment, the invention provides for a pre-cured coating mixture comprising a radiation-curable resin and an initiator, or a thermally-curable resin and thermal initiator, wherein the radiation- or thermally-curable resin and the respective initiator form a pre-cured coating mixture capable of forming a macroscopic texture upon application of the mixture on a substrate. In another embodiment, provided for is a pre-cured coating mixture comprising a radiation- or thermally-curable resin, an initiator, and texture-producing particles having an effective size to provide a macroscopic texture upon application of the mixture on a substrate. In another embodiment, the invention provides a coated substrate comprising a substrate and a radiation- or thermally-cured coating on at least a portion of the substrate, wherein the coating comprises an inherent macroscopic texture. Additionally, provided for is a process for making a coating on a substrate, comprising the steps of distributing a pre-cured coating mixture comprising a radiation-curable resin and an initiator or a thermally-curable resin and thermal initiator over at least a portion of a substrate to form a pre-cured coating having a macroscopic texture, and radiation-curing or thermally curing, respectively, the pre-cured coating to form a radiation-cured or thermally-cured coating having the macroscopic texture.

Chinese Publication No. 204920130 for a "Porcelain Timber Apron Brick," published on Dec. 30, 2015 by Yang P., discloses a porcelain timber apron brick, including a ceramic tile layer, wood board layer, and waterproof layer. The wood board layer and waterproof layer are fixed respectively on both sides of the ceramic tile layer, with the wood board layer located on the upper surface of the ceramic tile layer. In the Yang tile, the thickness of the wood board layer and waterproof layer, in combination is less than the thickness of the ceramic tile layer. Being equipped with the wood board layer prevents the brick surface temperature from being excessively low and improves comfort during use. The waterproof layer effectively prevents the waterlogging on the ground from entering the ceramic tile layer and wood board layer, granting a waterproof performance of the tile.

Chinese Publication No. 201972361 for a "Wood and Ceramic Composite Floor Tile," published on Sep. 14, 2011 by Liang Y., discloses a wood and ceramic composite floor tile comprising a core material, a panel, and a bottom plate, wherein the core material is arranged between the panel and the bottom plate. The core material is connected with the panel and bottom plate respectively through an adhesion layer, and is one or more ceramic tiles. Frame bars are also provided and are arranged at the periphery of the core material. The tile attempts to solve problems of ceramic tile in that existing wood and ceramic composite floor tiles are easy to damage and feature high manufacturing costs. The disclosed tile provides for a composite floor tile that is difficult to damage, easy to process, convenient to install, and has high non-deformability features, thereby effectively lowering costs of the tile.

U.S. Pat. No. 8,166,718 for a "Horizontally Engineered Hardwood Floor and Method of Installation," issued on May 1, 2012 to David C. Liu, provides for a floor board that includes a top decorative layer placed a plurality of strips. The plurality of strips is arranged to have some in X-axis orientation and some in Y-axis orientation. The plurality of strips also has characteristics that allow the wood floor board to be installed as a tile. Specifically, the Liu patent covers a high performance engineered wood floor board having a length, comprising (1) a top wood layer with wood grain lined up along the length of the floor board, the top wood layer having a top surface and a bottom surface; (2) a plurality of supporting strips attached under the top wood layer, a first subset of the plurality of supporting strips being oriented in a first direction and a second subset of the plurality of supporting strips being oriented in a second direction, the first subset of the plurality of supporting strips being separated physically from and without being in contact with the second subset of the plurality of supporting strips, wherein the top wood layer substantially covers the first and second subsets of supporting strips; and (3) an adhesive layer placed between the top wood layer and the plurality of supporting strips. The adhesive layer covers the bottom surface of the top wood layer. Additionally, a first supporting strip in the plurality of support strips has a locking lip, and a second supporting strip in the plurality has a recessed slot, and the locking lip of the first supporting strip of the high-performance engineering wood floor board is able to couple to the recessed slot of the second supporting strip of the floor board.

International Publication No. WO 2005/116362 for "A Ceramic Wood Laminated Floor," published on Dec. 8, 2005 by Delong Tao, discloses a floor consisting of a base layer that is made of ceramic tile, and a surface layer that is made of wood or bamboo. Between the surface layer and the base layer, a bonding coat is set. The undersurface of the base layer is equipped with an elastic pad.

SUMMARY OF THE INVENTION

This invention provides a method of producing a glueless dustless composite flooring material system of PVC-based flooring having waterproof layers providing different qualities of hardness, wear resistance, sound deadening, and decorative patterns, with layers fused together without glue or adhesives, with a UV-cured top coating, optional, changeable design printing and texturing, and optionally having an underlayment layer, which can be manufactured in a sheet-form, essentially continuous-run manner, with an ability to quickly and simply change the optional design printing and texturing produced, yielding a long-lasting, high-performing flooring product.

This invention avoids the use of water-permeable compressed cellulose material such as sawdust filler, which is susceptible to water damage such as swelling and failing. This invention avoids the use of glue or adhesive, which is susceptible to premature delamination failure and which increases the costs and complexity of manufacturing. The flooring material provides a floor covering material free of water-based materials, such as water-based inks or dyes. The desirable qualities of compressed-dust filler and of glue or adhesive are provided in novel ways.

BRIEF DESCRIPTION OF THE DRAWINGS

Reference will now be made to the drawings, wherein like parts are designated by like numerals, and wherein.

DETAILED DESCRIPTION OF THE INVENTION

Referring to all figures generally, embodiments of the glueless dustless composite flooring system 100 and production method 200 are illustrated.

Figure 1:
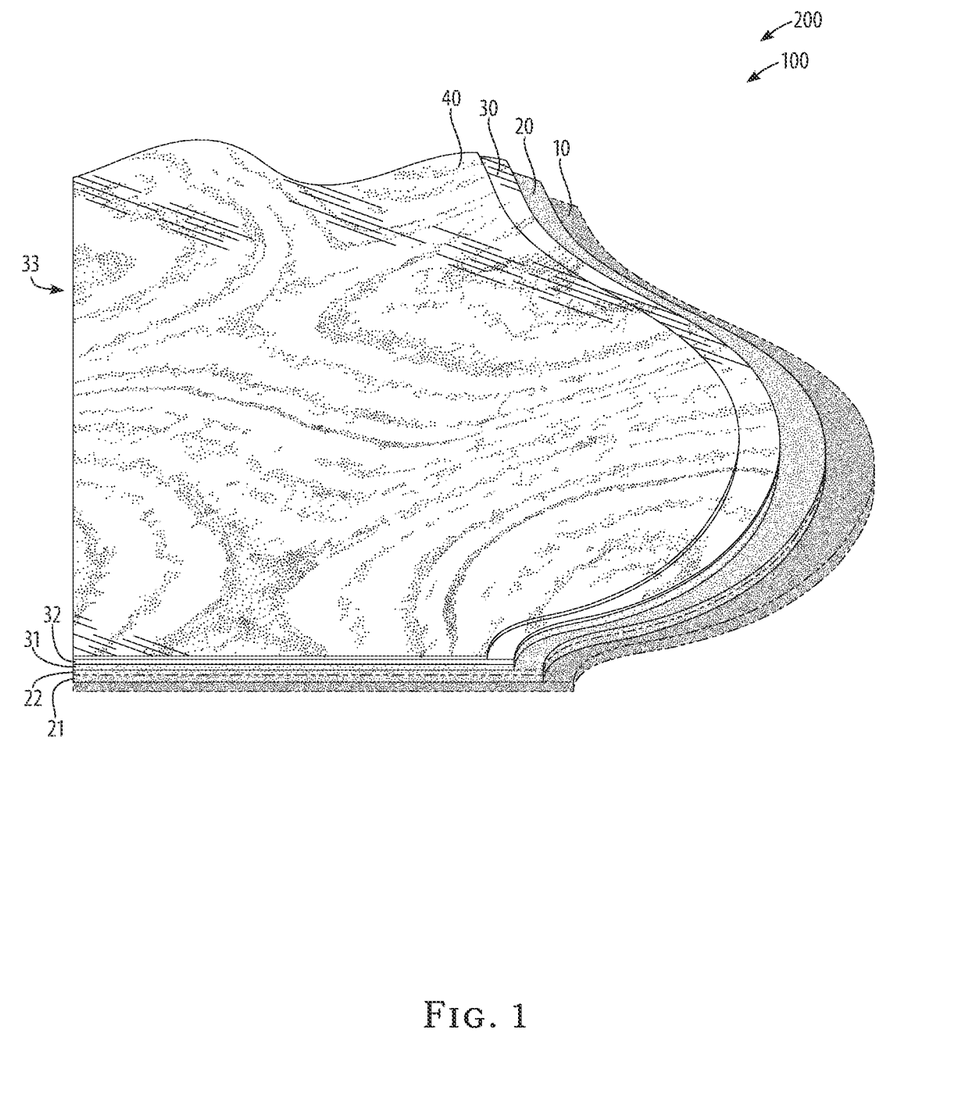
FIG. 1 is a schematic cutaway view of an embodiment of the glueless dustless composite flooring material system of the invention.
Figure 2:
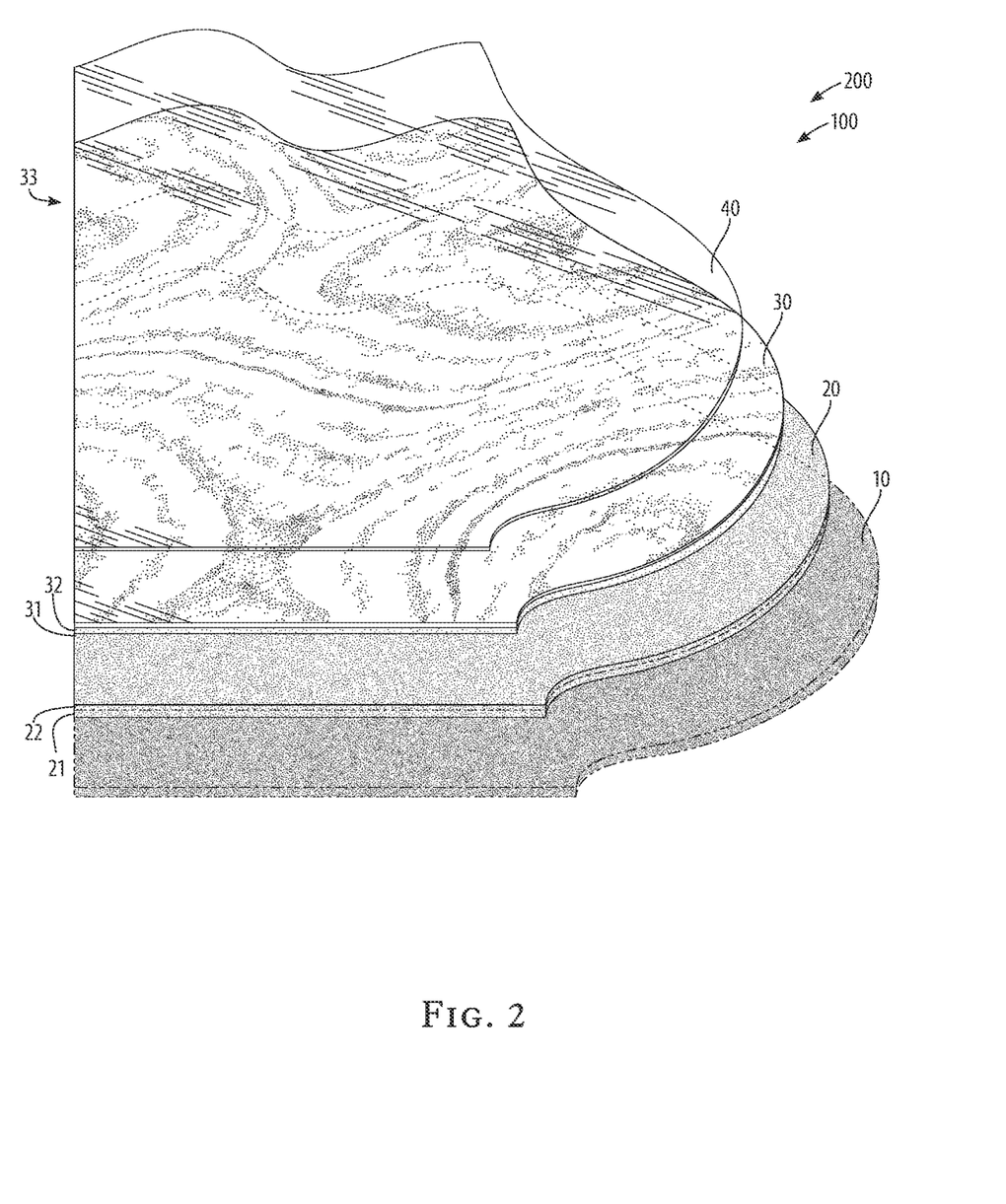
FIG. 2 is schematic exploded view of an embodiment of the glueless dustless composite flooring material system of the invention.

Referring to FIG. 1 and FIG. 2, the glueless dustless composite flooring system 100 comprises three waterproof layers 20, 30, 40 of different materials strongly bonded one to another without the use of separate glues or adhesives, and an optional underlayment layer 10. The optional underlayment layer 10 can be a natural material such as cork or rubber, or a synthetic material such as either an open-cell or a closed cell plastic foam. Ethylene vinyl acetate (EVA) is a suitable material. The glueless dustless composite flooring system 100 provides a waterproof covering for any type of optional underlayment layer 10 used, allowing the use of water sensitive materials for the underlayment. The optional underlayment layer 10 can be omitted, can be affixed to the finished flooring during manufacture, or can be made available as a separately packaged item. Depending upon the ability of any particular underlayment material to withstand the hot-melt overlaying process disclosed below, the underlayment can be affixed to the rest of the glueless dustless composite flooring system 100 either earlier or later in the manufacturing process.

The glueless dustless composite flooring system 100 provides a waterproof flooring base layer 20, which is formed by fusion, extrusion, and mold, forming of a blended mixture of PVC resins and other materials according to the glueless dustless composite flooring system method 200 illustrated in FIG. 8 and disclosed in more detail below. Optionally, two or more different mixtures of PVC resins and other fusion-compatible materials can be co-extruded into the same mold, which will produce a fused flooring base layer 20 with different sublayers or strata, such as the first base extrusion 21 and the second base extrusion 22 illustrated. The PVC-resin blend can be adjusted through the use of different materials and fillers, or different proportions of materials and fillers, to have different properties when fused and extruded. If one PVC-resin blend yields a desired hardness and stability, but is deficient in sound-deadening or other sponginess qualities, then a different PVC-resin blend or a different extrusion technique can be applied as a co-extrusion in order to provide the otherwise-missing qualities. In a preferred co-extruded embodiment, a stiffer, harder stratum is formed for strength and a dense-foam, springier stratum is formed for cushioning and sound absorption.

The ability to adjust the characteristics of the waterproof flooring base layer 20, and therefore of the overall finished flooring, by adjustment of one or more PVC-resin blends and one or more extrusion methods eliminates the need to use compressed dust, which is vulnerable to moisture and is otherwise problematic in some climates and for some uses. For example, the formation of a controlled amount of a dense foam consistency in the flooring base layer 20, either in that entire layer or stratified within that layer, depending on the concurrent need for stiffness, can duplicate the desirable qualities of a compressed-dust core, but without the disadvantages of the dust.

In one of the preferred embodiments, the mix of fusion-compatible materials included in a suitable flooring base layer 20 is: (a) 50 kg PVC; (b) 100-175 kg 800-1000 mesh calcium carbonate (CaCO3); (c) 3.8-5.0 kg calcium/zinc heat stabilizer; (d) 2.5-5.0 kg chlorinated polyethylene elastomer; (e) 1.0-4.0 kg acrylic polymer modifier; (f) 0.4-0.6 kg internal lubricant; and (g) 0.5-1.5 kg high melting point polymer; and, optionally, (h) 0.2-0.3 kg high density polyethylene oxide.

In preferred embodiments, the PVC mixture comprises, by weight: between 20% and 35% polyvinylchloride, between 63% and 73% calcium carbonate, between 2% and 2.5% calcium/zinc heat stabilizer, between 1.6% and 2.5% chlorinated polyethylene elastomer, between 0.6% and 1.7% acrylic polymer modifier, between 0.2% and 0.25% internal lubricant, between 0.32% and 0.62% high melting point polymer, and optionally, between 0.06% and 1.22%, and optionally, between 0.1% and 0.12% high density polyethylene oxide. This mixture is suitable for either a singly extruded base layer or for a co-extruded layer or multiple co-extruded layers.

The method of producing the waterproof glueless dustless flooring material system provides for the mixing of the materials for the flooring base layer 20 in a suitable large container until the materials are thoroughly mixed. Then, either in the same large container or in a different one, the fusing step provides for the heating of the mixture of materials while continuing the mixing of the materials. A preferred embodiment of the method heats the mixture to 115-130° C. while stirring at a high speed approaching, but not exceeding, 1600 RPM. After fusion is complete, the fused PVC material is allowed to cool somewhat. The PVC material is destined to be re-heated in the extrusion process, so if the batch of fused mixture is to be immediately sent to the extruder, then the fused mixture needs to be cooled enough to be safely and efficiently conveyed from the dusty mixing and fusing area to the cleaner environs of the extrusion and molding area. This conveyance or delivery can be effected by using a large pipe, as is known in the art. Water or another coolant can be circulated in a jacket around the container used for fusing in order to carry heat away from the fused PVC mixture, taking care not to force too rapid of cooling, which might affect the plastic properties of the flooring base layer 20.

The mixing, fusing, and cooling steps are by nature batch processes. However, by careful adjustment and control of the processes, or by setting up more than one production line and staggering its operation, an essentially continuous supply of fused PVC material can be produced and supplied to the subsequent operations.

The fused PVC mixture is conveyed to a screw extruder for extrusion to an extrusion mold at an elevated temperature and pressure. A preferred embodiment is extruded using an 80 mm-diameter screw at a speed not exceeding 40 RPM, an extrusion pressure of 20-35 mpa, and a temperature of 160-186° C. More than one mixture can be co-extruded to the same extrusion mold for the purpose of forming different strata, as disclosed above. This extruding and mold-forming process yields a sheet of flooring base layer 20. The sheet can be very long, or essentially continuous. If the mixing-fusing-cooling-delivering steps of the process are properly coordinated so as to provide a continuous supply of fused PVC material to the screw extruder, then the extruder can supply an essentially continuous sheet of flooring base layer 20 for hot-melt overlaying of an essentially continuous sheet of flooring face layer 30.

Figure 3:
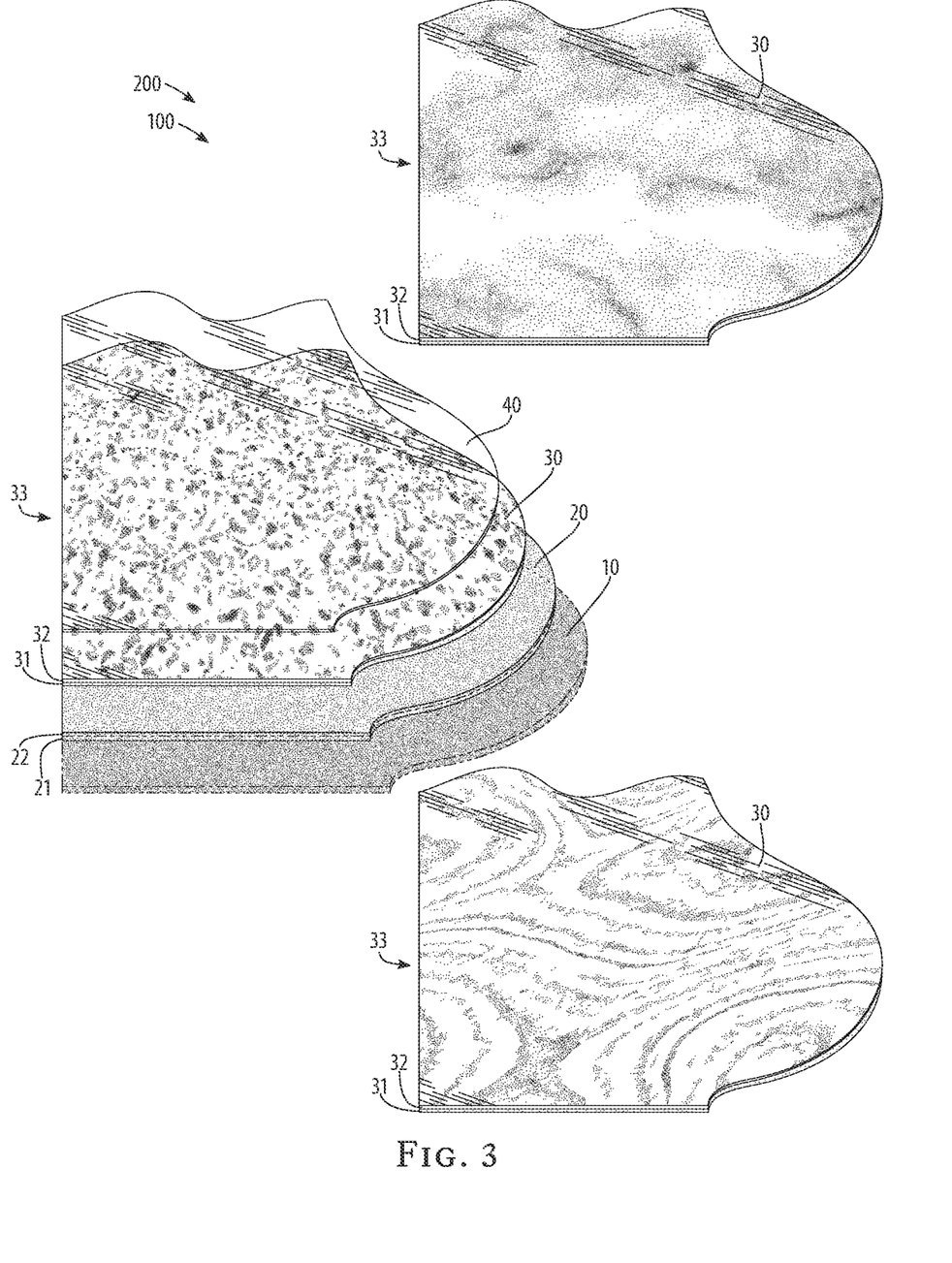
FIG. 3 is a schematic exploded view of embodiments of the glueless dustless composite flooring material system of the invention.
Figure 4:
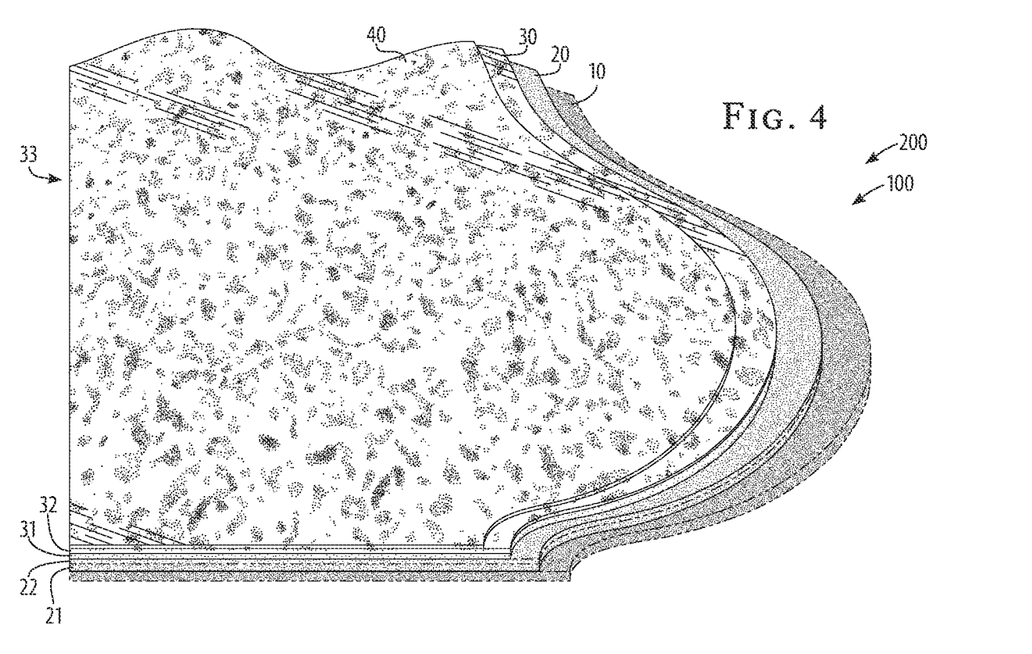
FIG. 4 is a schematic cutaway view of another embodiment of the glueless dustless composite flooring material system of the invention, imitating terrazzo.
Figure 5:
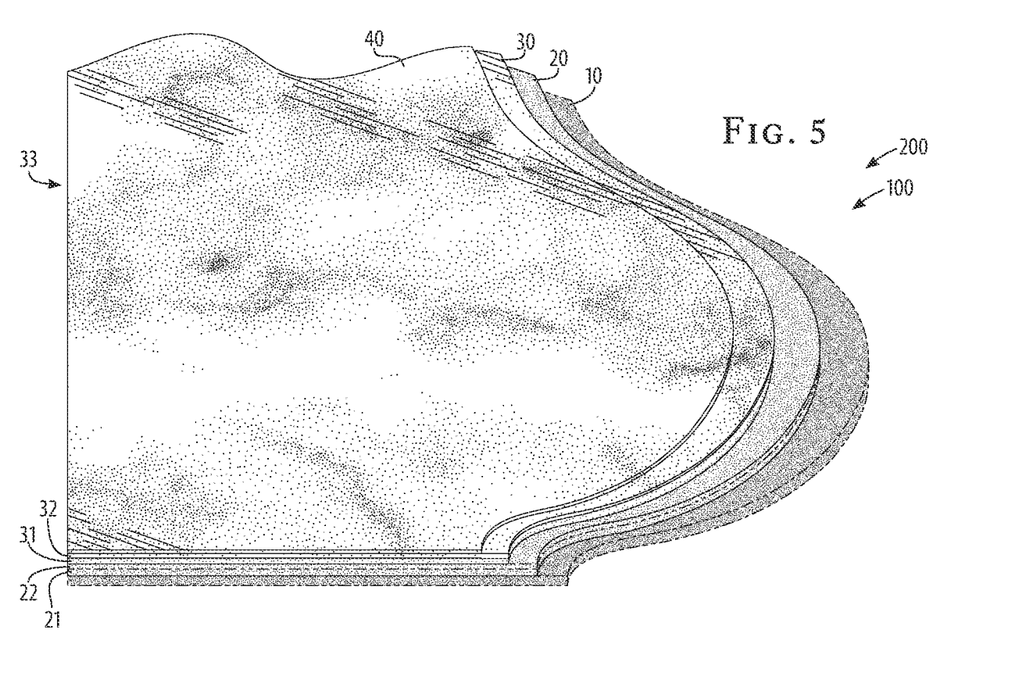
FIG. 5 is a schematic cutaway view of another embodiment of the glueless dustless composite flooring material system of the invention, imitating marble.
Figure 6:
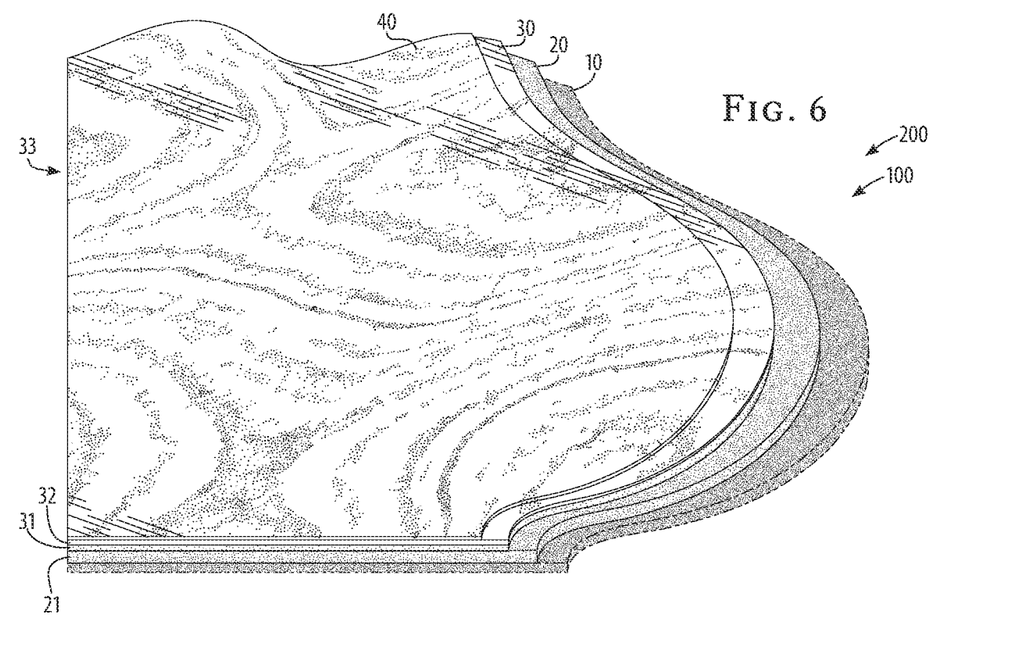
FIG. 6 is a schematic cutaway view of an embodiment of the glueless dustless composite flooring material system of the invention, having a single-extruded base layer.
Figure 7:
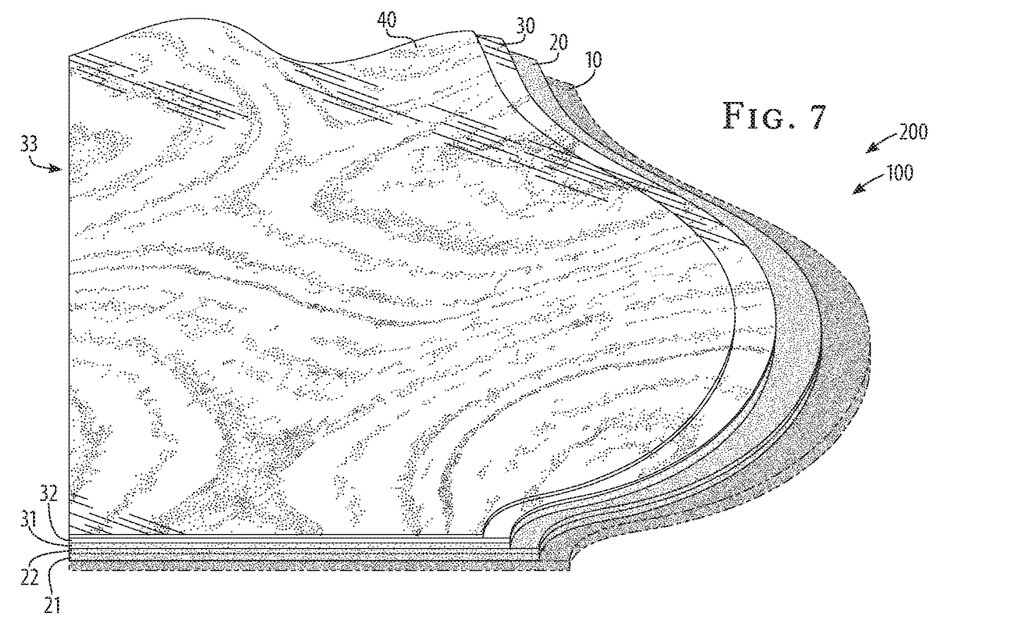
FIG. 7 is a schematic cutaway view of an embodiment of the glueless dustless composite flooring material system of the invention, having a double-extruded base layer.

The flooring face layer 30 comprises a decorative face sublayer 31 fused to a wearing face sublayer 32. The decorative face sublayer 31 can be formed from a PVC decorative film, and will usually be opaque and of a color acting as a base color or background color for any decorative pattern 33 that is intended to be applied, such as imitations of wood, stone, or tile, or other decorative patterns. The wearing face sublayer 32 can be formed from a high molecular wear-resistant PVC polymer film, usually clear or mostly clear, so that the decorative face sublayer 31 may be seen. In most embodiments of the glueless dustless composite flooring system 100, a decorative pattern 33 will be applied to the decorative face sublayer 31 before it is fused with the wearing face sublayer 32. The decorative pattern 33 is likely to be in imitation of traditional flooring materials such as wood, stone, or tile. Referring briefly to FIG. 3, illustrating schematically that the flooring face layer 30 might have a decorative pattern in imitation of marble, terrazzo, or wood, different decorative patterns 33 can be used with the glueless dustless composite flooring system 100. The patterns can be applied with a printing roller or with a digital image-printing device. An advantage of digital printing is that an image with no exact repetition or a very long period of repetition can be produced, in contrast with the repetition inherent in roller printing. Another advantage of digital printing is that several different colors, shades, or tones can be applied or even blended in place, which is either very cumbersome or is not possible with roller printing in a floor-manufacturing environment.

The PVC decorative film forming the decorative face sublayer 31 can be supplied in large rolls. The strength and wear characteristics of this PVC decorative film do not significantly influence the strength and wear characteristics of the finished flooring, because other elements provide such strength and wear characteristics. As a practical matter, the PVC decorative film should be strong enough to avoid tearing during the floor-manufacturing process.

The use of a high-molecular wear-resistant PVC polymer film for the wearing face sublayer 32 provides a significant portion of the desired wear resistance of the finished flooring, with the flooring coating layer 40 providing the rest. This film can also be supplied in large rolls.

An essentially continuous sheet of flooring face layer 30 can be produced by using large rolls of the PVC films, or by having an efficient re-loading method.

Although the wearing face sublayer 32 can be fused to the decorative face sublayer 31 as a separate step in the manufacturing process, before subsequently being fused with the flooring base layer 20, a preferred embodiment of the glueless dustless composite flooring system method 200 provides for simultaneous fusing of the wearing face sublayer 32, the decorative face sublayer 31, and the flooring base layer 20 in one pass. This fusion is achieved by hot-melt overlaying, bringing the sublayers and layers into contact with one another in the proper order, and simultaneously heating and applying compression to the stack to fuse the layers together without the use of glue or adhesive, and therefore essentially eliminating potential problems of delamination or other failure of the finished flooring. The hot-melt overlaying can be effected by feeding the wearing face sublayer 32, the decorative face sublayer 31, and the flooring base layer 20 into a set of heated rollers. Where the wearing face sublayer 32 and the decorative face sublayer 31 are supplied as large rolls of PVC polymer films of essentially equal width, and the flooring base layer 20 is formed in sheets of essentially the same width as the rolls of films, or in divisions of that width allowing side-by-side simultaneous processing of multiple sheets, the hot-melt overlaying can be performed in a continuous or nearly continuous run.

Optionally, a textured, embossed, synchronized embossed, debossed, or synchronized debossed surface pattern can be applied to the flooring face layer 30 of the fused base and face layers. Such a texture can be an imitative decorative texture complementing or synchronizing with a printed decorative pattern 33, or can be a texture intended to improve traction, light reflection, or other qualities of the finished flooring. The textured, embossed, synchronized embossed, debossed, or synchronized debossed surface pattern can be applied to the flooring face layer 30 of the fused base and face layers either concurrently with the hot-melt overlaying compression stage or immediately after, while the flooring face layer 30 is still partially melted and pliable. The hot-melt roller or rollers making contact with the flooring face layer 30 can be configured to emboss the texture, although the arrangement would require either a small repetitive period of the texture or a large roller. The embossing can be performed by one or more rollers, plates, or other devices, such as rakes pressing into the flooring face layer 30 of the now-fused base and face layers immediately after the hot-melt overlaying compression, while the partial assembly is still pliable. Depending on the amount and nature of the texturing, cylinders of stiff wire could be used as rollers for debossing, perforated cylinders could be used as rollers for embossing, or a rake arrangement, possibly allowing for movement of the tines in order to create variation, could be used.

The hot-melt overlaying fuses the flooring face layer 30 and the flooring base layer 20 together without the use of glue or adhesive. The face-and-base subassembly emerges from the hot-melt overlaying and optional texturing at a very high temperature. The face-and-base subassembly is then conditioned. This conditioning step allows the face-and-base subassembly to cool to the ambient temperature fairly slowly and evenly, without quenching or other sudden cooling, in order to prevent the development of stress in the sheet. Because the face-and-base subassembly is a thin sheet that is almost completely surface area, the cooling does not require an inordinate amount of time, and conditioning can be effected on a continuous-run basis by providing a sufficient extra length of conveyor belt to allow for cooling. Optionally, additional conditioning procedures can be performed, such as corona discharging or flaming in order to prepare the PVC surface for application of the flooring coating layer 40. The optional underlayment 10 can be added to the subassembly at this point or subsequent points after the hot-melt overlaying and optional texturing have been performed.

An essentially continuous sheet of the face-and base subassembly can be produced by the hot-melt overlaying step if there is a continuous supply of base-layer and face-layer sheet.

After the face-and-base subassembly has cooled in the conditioning step, the subassembly is then coated on the top or flooring-face-layer 30 side with a plastic resin which can be cured under ultraviolet (UV) light, forming a flooring coating layer 40. UV-curing primers and top coatings suitable for application onto PVC are known in the art. Generally, the UV-curing primer and top coating will be clear, colorless, and transparent, allowing the decorative pattern 33 to show through. Generally, colorless coatings can be cured more quickly and with less exposure than colored coatings. UV-curing top coats are available which provide a glossy finish or a matte finish, and which have such desirable properties as scratch resistance. Optionally, a gritty particulate material such as aluminum oxide or ceramic powder or other anti-abrasive material can be added to the UV-curing plastic resin and incorporated into the flooring coating layer 40 to provide additional traction and additional wear resistance. In a preferred embodiment, the UV primer and the UV top coats are applied with a series of rollers in long runs or a continuous run.

There should be an application of UV-curing primer and at least one application of UV-curing top coat, although more than one application of UV-curing top coat will likely improve the appearance and durability of the finished flooring. The curing is effected by exposure to UV light from, for example, Mercury (Hg) lamps or Gallium (Ga) lamps. UV curing is effected very quickly, in only a few seconds, and can be accomplished in the time that a work piece travels on a conveyer belt passing under a bank of UV lights. In contrast, oxidative curing of polyurethane is likely to take eight to ten hours, and curing of a two-part epoxy is likely to take at least thirty minutes or more.

The use of UV-curing plastic resins in the flooring coating layer 40 of the glueless dustless composite flooring system method 200 eliminates a potential bottleneck in the manufacturing process, which enables production of an essentially continuous sheet of fully assembled, fused, deco rated, coated, and cured flooring material. The coating and UV curing of the fused base-and-face subassembly yields a finished-large-sheet assembly of a composite flooring material that incorporates the flooring base layer 20, the flooring face layer 30, and the flooring coating layer 40, with an optional underlayment layer 10. This finished-large-sheet assembly is intended to be divided into segments of desired size and configuration, such as a tile or a plank, which can be easily handled during installation, or a large rolled sheet.

The final steps in the glueless dustless composite flooring system method 200 are profile processing, in which the large sheet of finished flooring material is cut to the desired size and has the appropriate notches, grooves, tabs, or other installation-related components formed. Optionally, bevels can be processed on two sides or four sides of profiled flooring material, painted with colors, sometimes to imitate designs on wood, tiles, textile or marble, such as grey color on bevels to simulate grout lines between tiles and black or dark colors to simulate French bleed on wood. From a profile view, the bevels could be in different shapes, like straight lines forming angles, or square, or rounded arcs. Then inspect and pack the finished flooring material for transport and sale.

Figure 8:
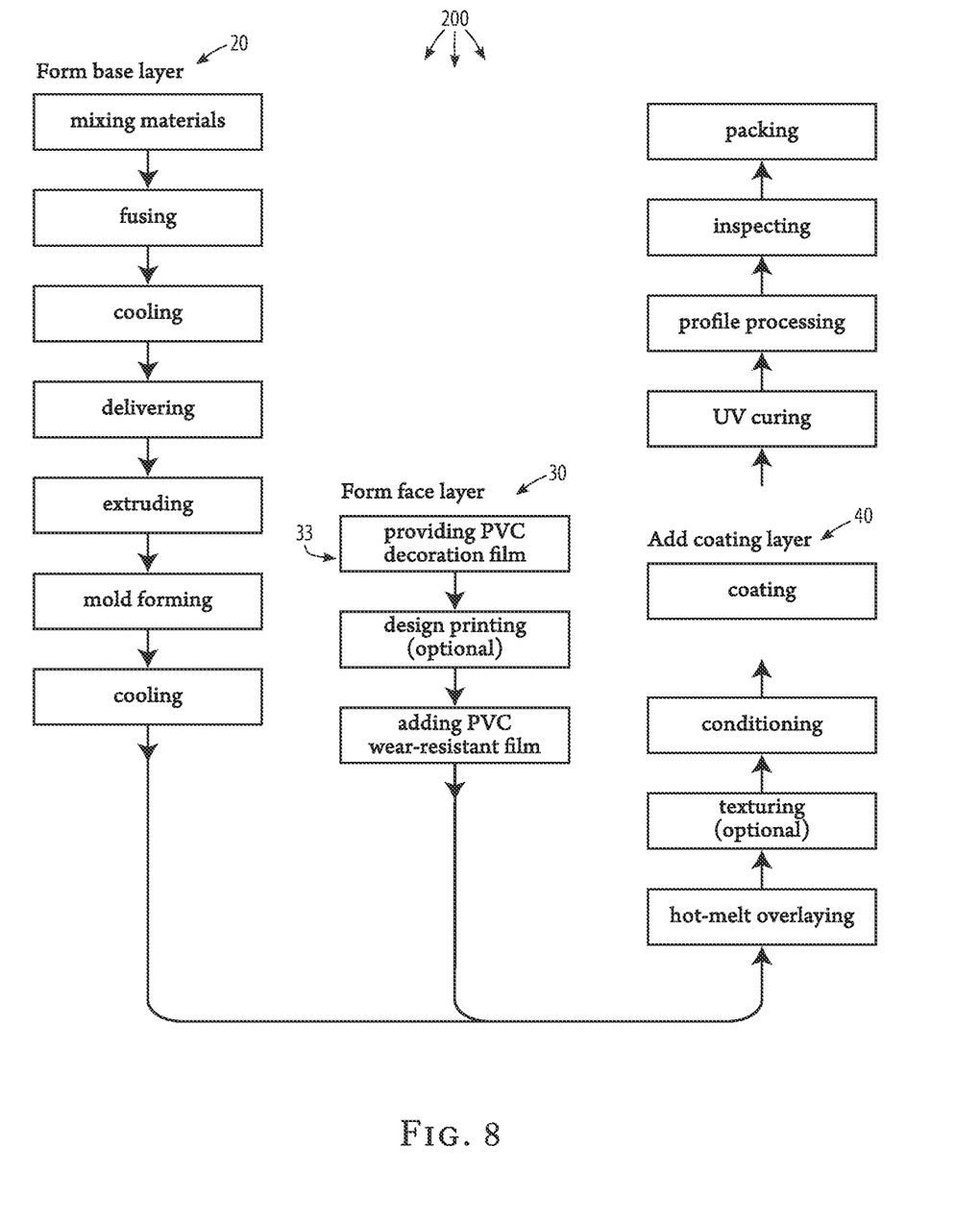
FIG. 8 is a flow chart representation of the method of production of the glueless dustless composite flooring material system of the invention.

Referring to FIG. 8, a flowchart representation of the glueless dustless composite flooring system production method 200, the flooring base layer 20 is formed from PVC and other raw materials by the mixing, fusing, cooling, delivering, extruding, mold-forming, and conditioning-cooling, yielding a sheet-form supply of flooring base layer 20 that can be essentially continuous. The flooring face layer 30 is separately, and potentially simultaneously, formed by providing PVC decoration film, optionally printing a decorative pattern 33 upon it, and then adding PVC wear resistant film, yielding a sheet-form supply of flooring face layer 30 that can also be essentially continuous. Then the sheets of flooring base layer 20 and flooring face layer 30 are brought into proximity in the appropriate orientation and fused together, without glue or adhesives, by hot-melt over laying, optionally followed by texturing, yielding a sheet form supply of base-and-face subassembly that can also be essentially continuous. Then a conditioning step allows the hot-melted base-and-face subassembly to cool, and optionally provides other conditioning procedures. Then a coating of UV-curing plastic resin is applied as a primer layer and at least one top coat layer. After each application of UV-curing plastic resin, the sheet of coated flooring material is subjected to UV curing by exposure to UV light, effecting a very rapid curing. The conditioning, coating, and UV curing processes can be performed on an essentially continuous, sheet-form supply of base-and-face subassembly, and yields a sheet-form supply of finished, fused, coated, and cured flooring material that can also be essentially continuous. Then the sheet of finished flooring is cut to size and has any notches, grooves, or tabs for installation purposes formed in the profile processing step. Inspecting and packing the profiled flooring-material pieces are the finals steps.

The glueless dustless composite flooring system method 200 provides an ability to manufacture flooring on a continuous-run assembly-line conveyor-belt basis. It also provides an ability to efficiently change production from one color or design pattern to another. It yields a flooring material product that contains no dust and no glue, yet possesses the desirable qualities associated with dust and glue, which are achieved by other, novel means.

It is envisioned that digital printing can be applied to the base flooring layer 20. In such case, before application, hydro UV primer is applied for good adhesion properties, and then UV putty applied for a smooth base. Next, a UV sealer is applied for a standard white base for printing on PVC. With digital printing especially, the design options are almost endless. Before printing, texture can be achieved by using different rollers to achieve the desired textured look, such as for instance, smooth, hand scraped, embossed in registered, tick marked, saw marked, BP, and wood grain. After printing, anti-abrasive sealer, sanding sealer, structure coating, and anti-scratch top coating will be applied, which provides anti-scratch and anti-abrasive wear layer. In this case, there may not be a need for the flooring face layer 30, which has a PVC decorative film and a high molecular wear-resistant PVC polymer film.

Many other changes and modifications can be made in the present invention without departing from the spirit thereof. We therefore pray that our rights to the present invention be limited only by the scope of the appended claims.

What is claimed is:

1. A method of producing a glueless dustless composite flooring material, comprising the steps:
   (i) forming a waterproof flooring base layer by:
      (a) providing a PVC resin mixture free of compressed cellulose material and adhesive and having fusion-compatible materials, by mixing PVC resin and the fusion-compatible materials, yielding the PVC-resin mixture;
(b) fusing the PVC-resin mixture by application of heat and continued mixing;
(c) cooling the fused PVC-resin mixture;
(d) delivering the cooled fused PVC-resin mixture to another area for further processing;
(e) extruding the delivered cooled fused PVC-resin mixture at elevated temperature and pressure;
(f) mold forming the extruded PVC-resin mixture into a sheet of said flooring base layer; and
(g) cooling the sheet of said flooring base layer;
(ii) forming a waterproof flooring face layer, by:
(a) providing a PVC decorative polymer film and a PVC wear-resistant polymer film; and
(b) adding the PVC wear-resistant polymer film atop of said PVC decorative polymer film;
(iii) hot-melt overlaying of said flooring face layer and said flooring base layer, yielding a sheet-form base-and-face subassembly;
(iv) conditioning said sheet-form base-and-face subassembly;
(v) coating said sheet-form base-and-face subassembly with a UV-curing plastic resin, thereby forming a waterproof flooring coating layer;
(vi) UV curing said coating of UV-curing plastic resin by exposure to UV light, yielding a finished-large-sheet assembly;
(vii) profile processing said finished-large-sheet assembly, yielding multiple composite-flooring-material segments of desired size and shape, thereby producing a waterproof floor covering free of water-based materials;
(viii) inspecting said composite-flooring-material segments; and
(ix) packing said composite-flooring-material segments;
where forming of said flooring face layer and forming of said flooring base layer can be performed simultaneously, yielding a supply of both for the step of hot-melt overlaying of said flooring face layer and said flooring base layer;
where said step of hot-melt overlaying of said flooring face layer and said flooring base layer accommodates an essentially continuous supply of said flooring face layer and said flooring base layer, and produces an essentially continuous supply of said sheet-form base-and-face subassembly;
where said step of conditioning said sheet-form base-and-face subassembly can be accomplished without slowing or stopping the pace of the essentially continuous supply of said sheet-form base-and-face subassembly;
where said step of coating said sheet-form base-and-face subassembly can be accomplished at the pace of the essentially continuous supply of said sheet-form base-and-face subassembly; and
where said step of UV curing said coating can be accomplished at the pace of the essentially continuous supply of said sheet-form base-and-face subassembly.

2. The method of producing the glueless dustless composite flooring material of claim 1, where said step of forming the flooring base layer further comprises steps of forming a first extruded base sub-layer and a second co-extruded base sub-layer fused atop the first base sub-layer, each sub-layer being formed by mixing, fusing, cooling, delivering, and co-extruding, followed by common mold forming, the second co-extruded sub-layer having a mixture comprising PVC resin and fusion-compatible materials adapted to provide additional desired qualities in said flooring base layer, in use.

3. The method of producing the glueless dustless composite flooring material of claim 1, further comprising attaching an underlayment layer.

4. The method of producing the glueless dustless composite flooring material of claim 1, where said PVC decorative polymer film further comprises a colored film.

5. The method of producing the glueless dustless composite flooring material of claim 1, where said forming the waterproof flooring face layer further comprises printing of a design upon said PVC decorative polymer film before addition of said PVC wear-resistant polymer film.

6. The method of producing the glueless dustless composite flooring material of claim 1, further comprising a step of texturing the face surface of said sheet-form base-and-face subassembly after said step of hot-melt overlaying and before completion of said conditioning.

7. The method of producing the glueless dustless composite flooring material of claim 1, where said PVC wear-resistant polymer film is transparent.

8. The method of producing the glueless dustless composite flooring material of claim 1, where said flooring coating layer is transparent.

9. The method of producing the glueless dustless composite flooring material of claim 1, where said flooring coating layer further comprises a gritty particulate material.

10. The method of producing the glueless dustless composite flooring material of claim 1, where said flooring coating layer further comprises aluminum oxide.

11. The method of producing the glueless dustless composite flooring material of claim 1, where said PVC-resin mixture comprises:
(1) 50 kg polyvinyl chloride (PVC);
(2) 100-175 kg 800-1000 mesh calcium carbonate;
(3) 3.8-5.0 kg calcium/zinc heat stabilizer;
(4) 2.5-5.0 kg chlorinated polyethylene elastomer;
(5) 1.0-4.0 kg acrylic polymer modifier;
(6) 0.4-0.6 kg internal lubricant; and
(7) 0.5-1.5 kg high melting point polymer.

12. The method of producing the glueless dustless composite flooring material of claim 1, where said PVC-resin mixture comprises:
(1) 50 kg polyvinyl chloride (PVC);
(2) 100-175 kg 800-1000 mesh calcium carbonate;
(3) 3.8-5.0 kg calcium/zinc heat stabilizer;
(4) 2.5-5.0 kg chlorinated polyethylene elastomer;
(5) 1.0-4.0 kg acrylic polymer modifier;
(6) 0.4-0.6 kg internal lubricant;
(7) 0.5-1.5 kg high melting point polymer; and
(8) 0.2-0.3 kg high density polyethylene oxide.

13. The method of producing the glueless dustless composite flooring material of claim 1, where said flooring coating layer further comprises an application of UV-curing primer and at least one application of UV-curing top coat.

14. The method of producing the glueless dustless composite flooring material of claim 1, where said curing by exposure to UV light further comprises exposure to Mercury (Hg) lamps.

15. The method of producing the glueless dustless composite flooring material of claim 1, where said curing by exposure to UV light further comprises exposure to Gallium (Ga) lamps.

16. The method of producing the glueless dustless composite flooring material of claim 1, where formation of said flooring base layer further comprises a step of heating the mixture to 115-130° C. while stirring at a high speed approaching but not exceeding 1600 RPM.

17. The method of producing the glueless dustless composite flooring material of claim 1, where hot-melt overlaying of said flooring face layer and said flooring base layer further comprises a step of passing the assembled flooring base layer and the flooring face layer through at least one set of heated rollers.

18. A method of producing a glueless dustless composite flooring material, comprising the steps of:
 (i) forming a waterproof flooring base layer by:
  (a) providing a PVC resin mixture having fusion-compatible materials, by mixing PVC resin and the fusion-compatible materials, yielding the PVC-resin mixture;
  (b) fusing the PVC-resin mixture by application of heat and continued mixing,
  (c) cooling the fused PVC-resin mixture;
  (d) delivering the cooled fused PVC-resin mixture to another area for further processing;
  (e) extruding the delivered cooled fused PVC-resin mixture at elevated temperature and pressure, where extrusion of said flooring base layer further comprises extrusion using an 80 mm-diameter screw at a speed not exceeding 40 RPM, an extrusion pressure of 20-35 mpa, and a temperature of 160-186° C.;
  (f) mold forming the extruded PVC-resin mixture into a sheet of said flooring base layer; and
  (g) cooling the sheet of said flooring base layer;
 (ii) forming a waterproof flooring face layer, by:
  (a) providing a PVC decorative polymer film and a PVC wear-resistant polymer film; and
  (b) adding the PVC wear-resistant polymer film atop of said PVC decorative polymer film;
 (iii) hot-melt overlaying of said flooring face layer and said flooring base layer, yielding a sheet-form base-and-face subassembly;
 (iv) conditioning said sheet-form base-and-face subassembly;
 (v) coating said sheet-form base-and-face subassembly with a UV-curing plastic resin, thereby forming a waterproof flooring coating layer;
 (vi) UV curing said coating of UV-curing plastic resin by exposure to UV light, yielding a finished-large-sheet assembly;
 (vii) profile processing said finished-large-sheet assembly, yielding multiple composite-flooring-material segments of desired size and shape, thereby producing a waterproof floor covering free of water-based materials;
 (viii) inspecting said composite-flooring-material segments; and
 (ix) packing said composite-flooring-material segments;
 where the step of forming said flooring face layer and the step of forming of said flooring base layer can be performed simultaneously, yielding a supply of both to said hot-melt overlaying process;
 where said step of hot-melt overlaying of said flooring face layer and said flooring base layer accommodates an essentially continuous supply of said flooring face layer and said flooring base layer, and produces an essentially continuous supply of said sheet-form base-and-face subassembly;
 where said step of conditioning said sheet-form base-and-face subassembly can be accomplished without slowing or stopping the pace of the essentially continuous supply of said sheet-form base-and-face subassembly;
 where the step of coating said sheet-form base-and-face subassembly can be accomplished at the pace of the essentially continuous supply of said sheet-form base-and-face subassembly; and
 where the step of UV curing said coating can be accomplished at the pace of the essentially continuous supply of said sheet-form base-and-face subassembly.

19. The method of producing the glueless dustless composite flooring material of claim 1, where said PVC wear-resistant polymer film and said PVC decorative polymer film is supplied on large rolls.

20. A method of producing a glueless dustless composite flooring material, comprising the steps of:
 (i) forming a waterproof flooring base layer by:
  (a) providing a PVC resin mixture free of compressed cellulose material and adhesive and having fusion-compatible materials, by mixing PVC resin and the fusion-compatible materials, yielding the PVC-resin mixture comprising, by weight, between 20% and 35% polyvinylchloride, between 63% and 73% calcium carbonate, between 2% and 2.5% calcium/zinc heat stabilizer, between 1.6% and 2.5% chlorinated polyethylene elastomer, between 0.6% and 1.7% acrylic polymer modifier, between 0.2% and 0.25% internal lubricant, and between 0.32% and 0.62% high melting point polymer;
  (b) fusing the PVC-resin mixture by application of heat and continued mixing;
  (c) cooling the fused PVC-resin mixture;
  (d) delivering the cooled fused PVC-resin mixture to another area for further processing;
  (e) extruding the delivered cooled fused PVC-resin mixture at elevated temperature and pressure;
  (f) mold forming the extruded PVC-resin mixture into a sheet of said flooring base layer; and
  (g) cooling the sheet of said flooring base layer; and
 (ii) forming a waterproof flooring face layer, by:
  (a) providing a PVC decorative polymer film and a PVC wear-resistant polymer film; and
  (b) adding the PVC wear-resistant polymer film atop of said PVC decorative polymer film;
 (iii) hot-melt overlaying of said flooring face layer and said flooring base layer, yielding a sheet-form base-and-face subassembly;
 (iv) conditioning said sheet-form base-and-face subassembly;
 (v) coating said sheet-form base-and-face subassembly with a UV-curing plastic resin, thereby forming a waterproof flooring coating layer;
 (vi) UV curing said coating of UV-curing plastic resin by exposure to UV light, yielding a finished-large-sheet assembly;
 (vii) profile processing said finished-large-sheet assembly, yielding multiple composite-flooring-material segments of desired size and shape, thereby producing a waterproof floor covering free of water-based materials;
 (viii) inspecting said composite-flooring-material segments; and
 (ix) packing said composite-flooring-material segments;
 where the step of forming a waterproof flooring base layer and the step of forming said flooring base layer can be performed simultaneously, yielding a supply of both to said hot-melt overlaying process;
 where said step of hot-melt overlaying of the flooring face layer and the flooring base layer accommodates an essentially continuous supply of said flooring face layer and said flooring base layer, and produces an essentially continuous supply of said sheet-form base-and-face subassembly;

where said conditioning process can be accomplished without slowing or stopping the pace of the essentially continuous supply of said sheet-form base-and-face subassembly;

where said coating process can be accomplished at the pace of the essentially continuous supply of said sheet-form base-and-face subassembly; and where the step of UV curing can be accomplished at the pace of the essentially continuous supply of said sheet-form base-and-face subassembly.

* * * * *